_Patented Feb. 3, 1948_

2,435,508

UNITED STATES PATENT OFFICE 2,435,508

MANUFACTURE OF DITHIO BIS-ARYLAMINES

Philip T. Paul and Lyndon B. Tewksbury, Jr., Naugatuck, Conn., assignors to United States Rubber Company, New York, N. Y., a corporation of New Jersey No Drawing. Application November 1, 1944, Serial No. 561,493

3 Claims. (Cl. 260—582)

This invention relates to improvements in the manufacture of dithio bis-arylamines, and more particularly 2,2'-dithiobisaniline having the formula

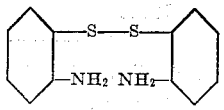

This chemical is also known as o,o'-diamino diphenyl disulfide.

2,2'-Dithiobisaniline is easily prepared in a crude state by heating aniline and sulfur at temperatures ranging between about 170 and about 180° C. for approximately 20 to 24 hours. A reaction proceeds according to the equation

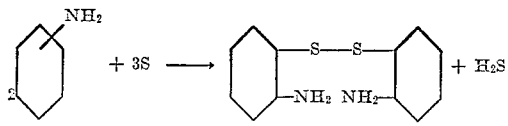

At the same time a quantity of 4,4'-dithiobisaniline is formed

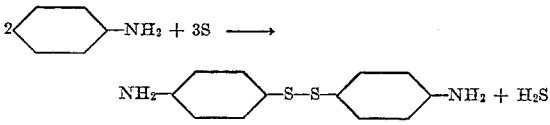

At the end of this heating period the reaction mixture consists of 2,2'-dithiobisaniline, 4,4'-dithiobisaniline and a large quantity of unreacted aniline and sulfur.

While the unreacted aniline can be separated readily by vacuum distillation or a steam distillation, the sulfur which is present in the form of soluble sulfur in the crude reaction mixture presents more difficulty, and when present during the subsequent acid extraction, interferes greatly therewith because the sulfur precipitates as a black viscous mass which is difficult to stir and hinders the extraction of the 2,2'-dithiobisaniline.

We have discovered that if the crude reaction mix is treated with a water-soluble sulfite that most of the unreacted sulfur can be separated by conversion to a water-soluble thiosulfate illustrated by

This treatment may be done after the excess unreacted aniline, or other aromatic primary amine similarly subjected to reaction with sulfur, has been distilled off. The removal of the bulk of the unreacted sulfur facilities the subsequent acid extraction and improves the yield of the 2,2'-dithiobisaniline.

The residue from the sulfite treatment consists substantially of 2,2'-dithiobisaniline and 4,4'-dithiobisaniline. The 2,2'-dithiobisaniline is separated from this residue by extracting with, for example, hot dilute hydrochloric acid, filtering the hot solution and cooling the acid extract to separate 2,2'-dithiobisaniline hydrochloride. The 4,4'-dithiobisaniline remains in solution.

The following example is given to illustrate the invention:

Example

A solution of 110 grams of sulfur in 204 grams of aniline is heated at 175–180° C. for twenty-four hours. The solution is then cooled and the unreacted aniline removed by steam distillation. The amount of aniline in the distillate is about 75 grams. The residue is about 205 grams.

The amount of unreacted sulfur may be readily calculated if the aniline and sulfur are assumed to react to give aniline disulfides. In this particular experiment, 129 grams of aniline are assumed to undergo reaction to aniline disulfides. This reaction will use up all but 43 grams of sulfur which will require 172 grams of sodium sulfite for conversion to the thiosulfate.

The crude aniline free reaction product is divided into two equal parts. One half of the material is stirred and heated on the steam bath with a slurry of 90 grams of anhydrous sodium sulfite (a 5% excess over the theoretical) in 150 cc. of water for six and one quarter hours.

The salt solution forms a layer underneath the oily layer. By the addition of water the relative positions of the layers can be reversed and the salt solution decanted. The salts are washed from the oil by stirring with two 150 cc. portions of hot water.

The oil is then extracted with 475 cc. hot eight percent hydrochloric acid, the mixture being stirred and heated at 80–90° C. for ten minutes. It is filtered hot. The acid-insoluble residue weighs 3.2 grams and is a dark green powder. The corresponding residue from the control is a tough, viscous mass weighing 20 to 25 grams.

On cooling the filtrate and scratching the walls of the beaker, there separates a voluminous precipitate of light yellow crystals of 2,2'-dithiobisaniline hydrochloride. This is filtered and dried.

For purification, the hydrochloride is taken up in 200 cc. hot water and the hot solution decanted from the small amount of oil which is largely sulfur. The free base can be obtained from the warm slurry of the hydrochloride by slow addition with stirring of six normal sodium hydroxide.

A 30 gram yield of 2,2'-dithiobisaniline, melting from 80 to 88° C. is obtained.

Examples of other sulfites that may be used are potassium sulfite, ammonium sulfite, and lithium sulfite.

It is to be understood that the expression "alkali-metal" herein embraces the hypothetical alkali-metal "ammonium." The proportion of sulfite used should be at least 1 molecular proportion for every molecular proportion of sulfur in the crude mix.

Other primary aromatic amines which are useful for the invention are exemplified by o-toluidine, p-toluidine, m-phenylene diamine, m-toluylene diamine, p-chloraniline, p-xenylamine, and b-naphthylamine, etc.

Having thus described our invention, what we claim and desire to protect by Letters Patent is:

1. A process of purifying a dithio-bis-arylamine produced by reaction of a primary arylamine with elemental sulfur whereby a crude mixture comprising unreacted sulfur, unreacted arylamine, and a dithio bis-arylamine is produced, which comprises agitating the crude mix with an aqueous solution of an alkali-metal sulfite, forming an oily layer and a watery layer, separating therefrom the oily layer containing dithio bis-arylamine, and extracting from the oil acid-soluble dithio bis-arylamine with aqueous non-oxidizing mineral acid.

2. A process of purifying 2,2'-dithiobis-aniline produced by reaction of aniline with elemental sulfur whereby a crude mixture comprising unreacted sulfur, unreacted aniline, and 2,2'-dithiobisaniline is produced, which comprises removing unreacted aniline from the crude mixture, then agitating the resulting mix with an aqueous solution of an alkali-metal sulfite, forming an oily layer and a watery layer, separating therefrom the oily layer containing 2,2'-dithiobisaniline, and extracting from the oil acid-soluble 2,2'-dithiobisaniline with aqueous hydrochloric acid.

3. A method of purifying 2,2'-dithiobisaniline produced by reaction of elemental sulfur with aniline, which comprises agitating the crude reaction mix containing sulfur and 2,2'-dithiobisaniline with at least one molecular proportion of sodium sulfite for every molecular proportion of sulfur in the crude reaction mixture.

PHILIP T. PAUL.
LYNDON B. TEWKSBURY, Jr.

REFERENCES CITED

The following references are of record in the file of this patent:

UNITED STATES PATENTS

| Number | Name | Date |
|---|---|---|
| 2,279,277 | Shoemaker | Apr. 7, 1942 |

FOREIGN PATENTS

| Number | Country | Date |
|---|---|---|
| 141,440 | Great Britain | Apr. 19, 1920 |

OTHER REFERENCES

Chemical Abstracts, vol. 29 (1935), pages 1790–1791.

Hodgson et al., J. Chem. Soc. (London), 1934, page 1140.